July 25, 1961   L. W. CHUBB ET AL   2,993,440
CONTROL DEVICE

Filed April 6, 1945   6 Sheets-Sheet 1

INVENTORS
Lewis W. Chubb, Sidney Siegel,
and Herbert L. Prescott.
BY
Paul E. Friedemann
ATTORNEY

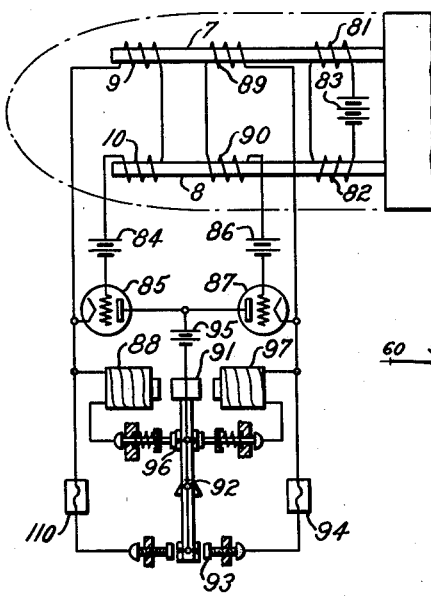
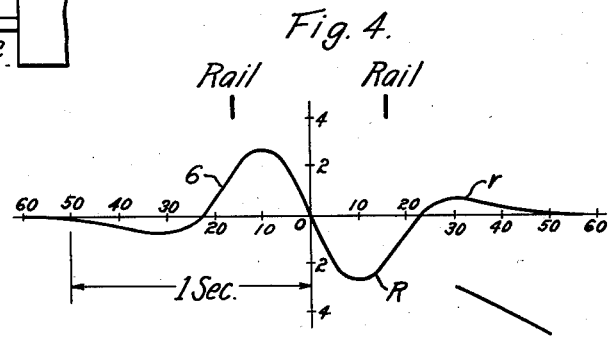
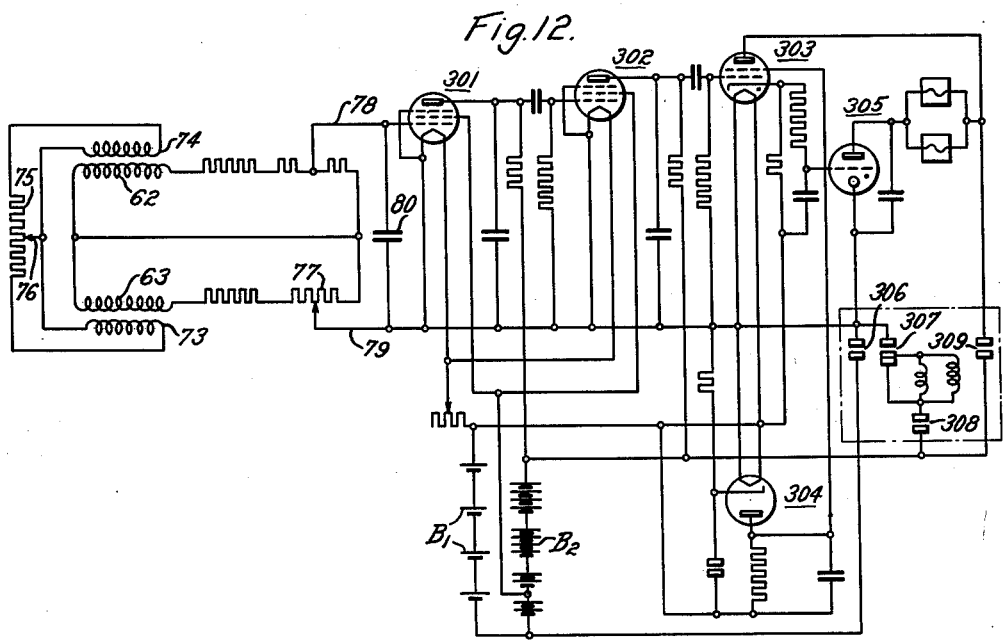
INVENTORS
Lewis W. Chubb, Sidney Siegel,
and Herbert L. Prescott.
BY
Paul E. Friedemann
ATTORNEY

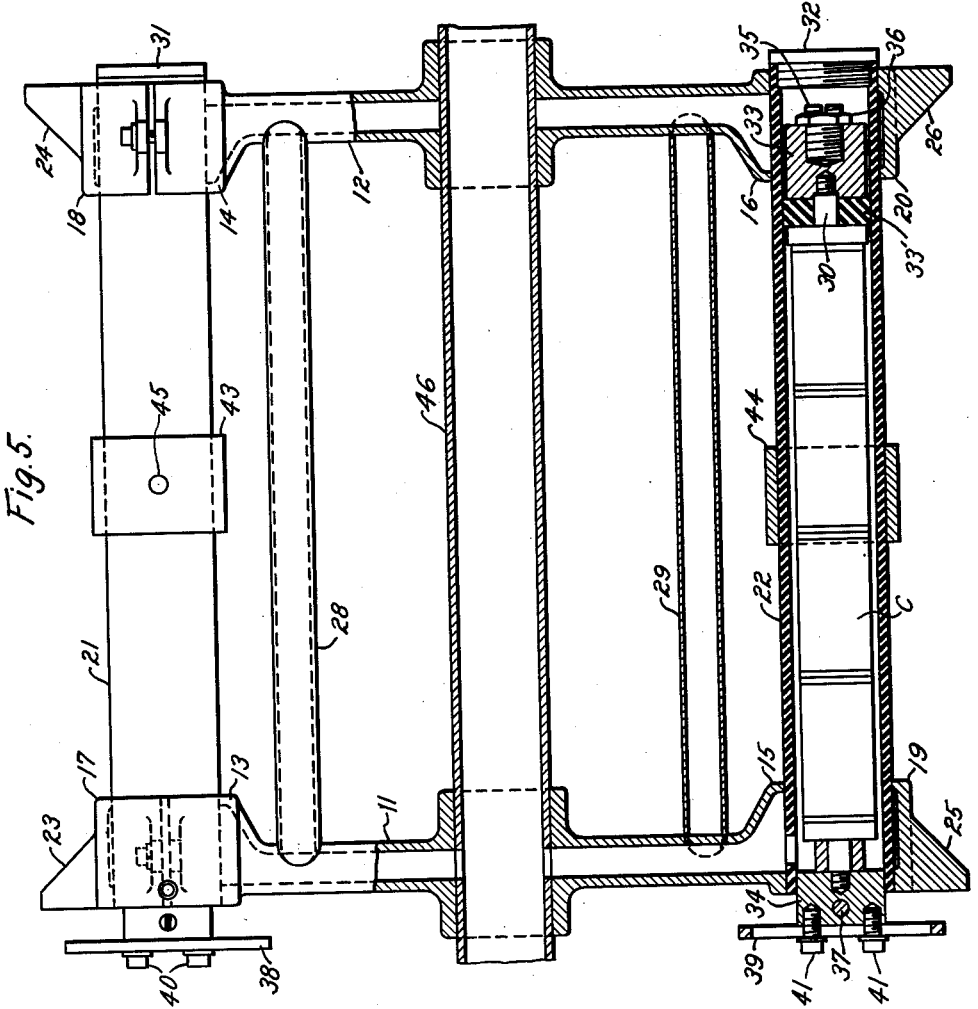
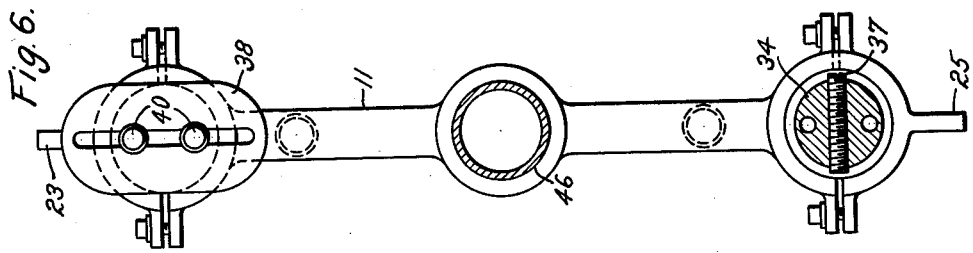

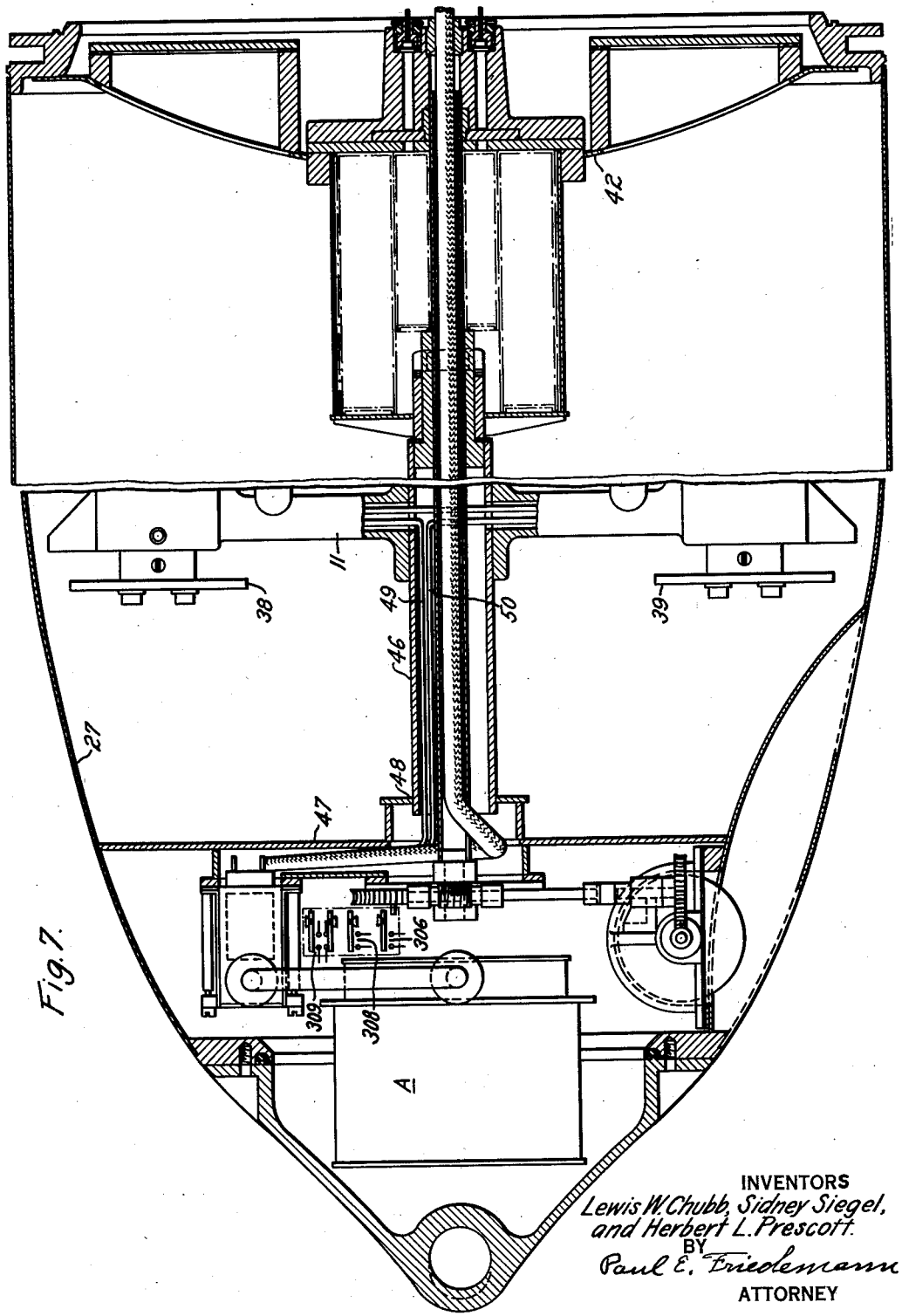

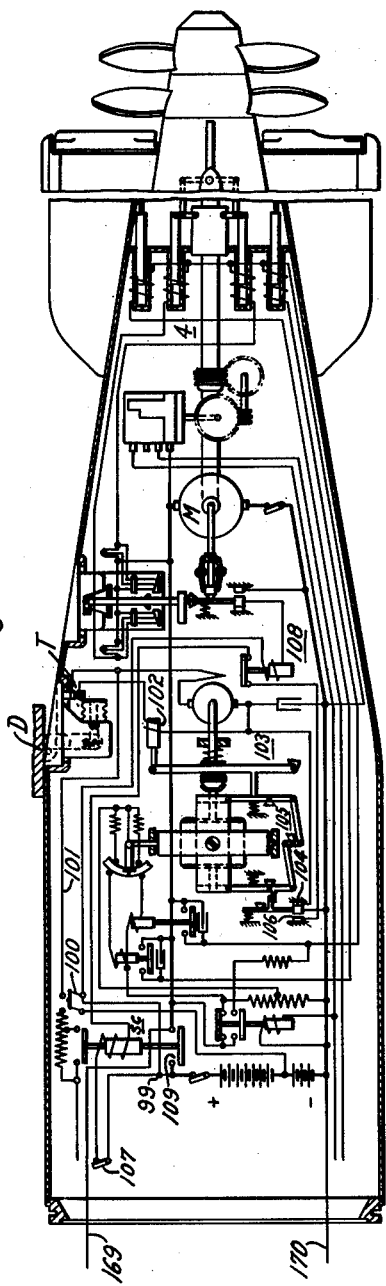

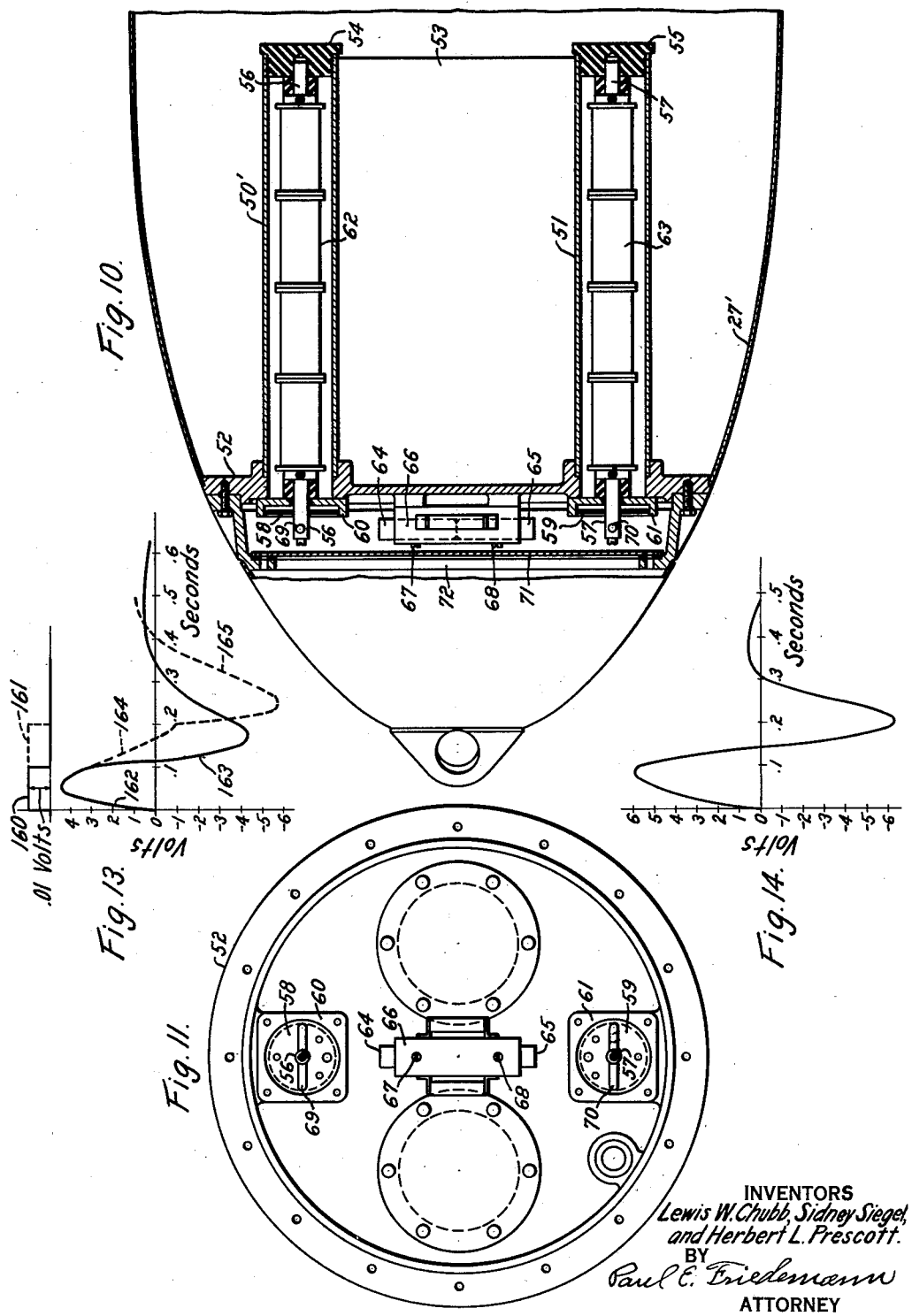

United States Patent Office

2,993,440
Patented July 25, 1961

2,993,440
CONTROL DEVICE
Lewis W. Chubb and Sidney Siegel, Wilkinsburg, Pa., and Herbert L. Prescott, Hickory Township, Mercer County, Pa., assignors, by mesne assignments, to the United States of America as represented by the Secretary of the Navy
Filed Apr. 6, 1945, Ser. No. 586,874
34 Claims. (Cl. 102—18)

Our invention relates to magnetic detonators and more particularly to magnetic detonators for torpedoes.

The Government of the United States has been granted a certain royalty-free license for governmental purposes with respect to the invention herein described.

The effectiveness of any magnetic detonator is, of course, dependent, if the detonation is to be by electric current, upon the voltage that can be caused to appear at the output terminals of a coil disposed in a magnetic field that is subjected to change. The fundamental equation is $$V = \frac{K dH}{dt}$$

where V is the induced voltage, K is the proportionality constant, and $dh/dt$ represents the change of flux with respect to time. The foregoing is, of course, all well known and is applicable to any type of magnetic detonator responsive to a change of the magnetic field at an electric coil disposed in a magnetic field subject to change. Magnetic mines are usually detonated by the use of this fundamental principle.

Torpedo detonation, as generally in vogue, depends on contact of the torpedo with the target ship. The rapid movement of the torpedo through the water is suddenly halted by the target ship whereupon an inertia device is operated to cause detonation of the charge carried by the torpedo.

For the most effective use of the charge, and several other reason, it is advisable to operate the torpedo relatively deep in the water. This deep operation of the torpedo at times defeats the main purpose of the use of the torpedo because the torpedo may pass below the keel of the target ship, or at other times either a short distance beyond the bow of the ship or the stern of the ship. When the torpedo passes within a small distance, such as five to seven feet of the target, it is desirable to have it explode; while if the torpedo misses a greater distance, it is desirable to have it pass by without exploding so as not to reveal the presence of the submarine. Magnetic schemes of detonation to take place on the "near misses" are very desirable.

In submarine warfare, where torpedoes are use to destroy enemy shipping and war vessels, it is, as just indicated, not always possible to make a direct hit, yet the torpedo may pass sufficiently near its target that if it could be detonated the enemy vessel could be sunk or at least severely damaged.

One object of our invention is the provision of means for detonating a torpedo when in proximity of the target.

Another object of our invention is the provision of magnetically actuated means for detonating a torpedo by reason of the change of the magnetic field near the hull of a ship.

A somewhat more specific object of our invention is the provision of magnetic means responsive only to the change in magnetic gradient resulting from the proximity of a ship and not to certain changes in the gradient produced by enemy countermeasures.

Another specific object of our invention is the proivsion of magnetic means responsive only to the magnetic gradient along the average direction of travel of a torpedo toward a target.

A broad object of our invention is the provision for measuring the magnetic gradient of a magnetic field along a cylindrical region of space having a given longitudinal direction.

A specific object of our invention is the provision of measuring the changes in current induced in a solenoid moved at a fixed speed longitudinally of itself through the earth's magnetic field.

Another specific object of our invention is the provision of measuring the changes in current induced in solenoid means moved in a magnetic field at a fixed speed along a line substantially fixed in space, the arrangement being such that small angular movements of the solenoid means with reference to said line do not appreciably alter the current induced.

It is also an object of our invention to measure the algebraic sum of the currents induced in a pair of solenoids, having substantially identical electromagnetic, electrical, and other physical characteristics, and disposed in a fixed relation to each other, as the solenoids are moved as a unit parallel to themselves through a magnetic field.

A further but more specific object of our invention is the control of a device by an electric current induced in a pair of identical solenoids, disposed in fixed parallel relation to each other and connected in opposition to each other, as they moved substantially rectilinearly through a magnetic field.

The objects hereinbefore recited are merely illustrative because many other objects and advantages will become apparent from a study of the following specifications and the accompanying drawings, in which:

FIG. 3 is a schematic showing of a simple magnetic gradient device.

FIG. 4 shows a curve illustrating a typical magnetic "signature" of a destroyer.

FIG. 5 illustrates in side view, with certain parts in section, an actual mechanical embodiment of our invention.

FIG. 6 is a view from the forward end of the subject matter shown in FIG. 5, and also showing certain parts in section.

FIG. 7 is a vertical section of the warhead of a torpedo illustrating the embodiment shown in FIGS. 5 and 6 in position on the warhead.

FIG. 8 is a schematic showing of the midportion, afterbody, and tail cone of a torpedo illustrating the control circuits and devices, and propulsion equipment with which the embodiment shown in FIGS. 5, 6 and 7 is used.

FIG. 9 illustrates the electronic circuits used with the gradiometer shown in FIGS. 5, 6 and 7.

FIG. 10 is a vertical sectional view of a modified form of magnetic gradient device, showing the device in the warhead of a torpedo.

FIG. 11 is a view from the front of the warhead shown in FIG. 10, but with the nose cap removed.

FIG. 12 is a diagrammatic showing of the electronic circuit used with the magnetic gradient device shown in FIGS. 10 and 11.

FIG. 13 shows some voltage curves illustrating the kind of calculated response that the circuit shown in FIG. 12 should produce.

FIG. 14 is the actual voltage response curve the circuit shown in FIG. 12 produces.

To better understand the representative objects hereinbefore recited and the description to follow it will be convenient to specify a system of coordinates with axes directed along the principal axes of the torpedo. As indicated in FIG. 1, let Y represent the longitudinal axis of the torpedo and be directed toward the target, let X be at right angles to Y and be directed starboard, and let Z be directed vertically upward and be disposed at right angles to both X and Y.

Figure 1:
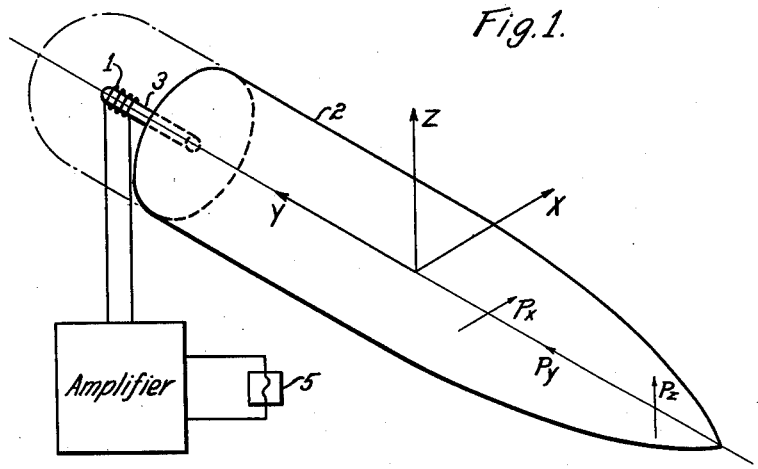
FIGURE 1 is a schematic showing of a torpedo provided with a single coil comprising a magnetic-field-change detecting device.
Figure 2A:
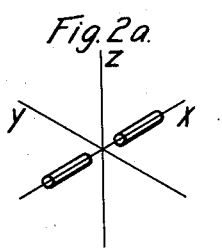
FIGS. 2a to 2i represent schematically nine possible positionings on a torpedo of magnetic gradient devices.
Figure 2B:
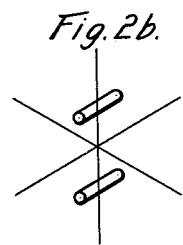
Figure 2C:
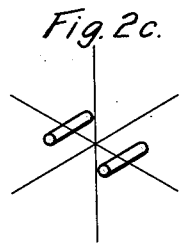
Figure 2D:
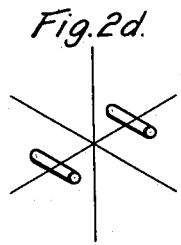
Figure 2E:
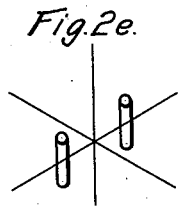
Figure 2F:
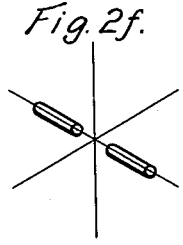
Figure 2G:
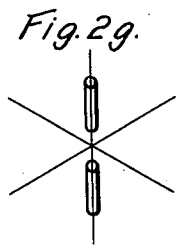
Figure 2H:
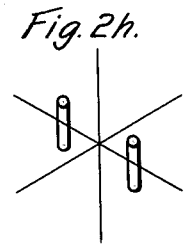
Figure 2I:
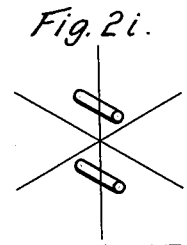

In FIG. 1, a single coil 1 is shown on a torpedo 2 having its axis along the Y axis of the torpedo. Let this coil 1 be provided with a core, as a "Hipernik" rod 3 having a relatively high effective permeability and let us assume that this single coil-rod unit, or field device, moves along the Y axis without any gyrations. Then the induced voltage is given by $$(1) \qquad V = NA\mu_a \frac{dH_y}{dt} \times 10^{-8} \text{ volts}$$

where $\mu_a$ is the apparent effective permeability of the core material used, N is the number of coil turns, A is the sectional area of the core, or rod, and $dH_y/dt$ is the change of flux along Y with respect to the change of time.

Since $v$, the velocity of the torpedo, is a measure of the change of distance with respect to time, that is $$v = \frac{dy}{dt}$$

Equation 1 may be written $$(2) \qquad V = NAv \frac{dH_y}{dy} \times 10^{-8}$$

or $$(3) \qquad V = K_1 \frac{dH_y}{dy}$$

(In actual practice, the speed of a torpedo is fairly constant at about fifty feet per second, that is $v=50$ ft./sec. $K_1$, therefore, may be considered as including $v$.)

In practice, a torpedo does not, however, move along Y only, as specified, but it also gyrates. A spurious voltage resulting from the gyrations will thus be induced in the coil even in a uniform field. This disturbing, or noise voltage, will be given by $$V_n = K_1 \frac{dH_y^1}{dt}$$

where $dH_y^1$ now is the Y field component, not with respect to the Y axis, fixed in space, but with respect to the rotating axes fixed in the torpedo.

If the steering equipment 4 (see FIG. 8) for the torpedo has a sufficiently refined control so that substantially no gyrations take place, after the torpedo is well under way and the magnetic detonator is made operative, then the noise voltage, $V_n$, need not be considered and the showing in FIG. 1, coupled with a suitable amplifier, would represent a perfectly operative and useful device. Existing steering controls do, however, not eliminate such gyrations.

With the actual steering controls used, it becomes important to know what relation $V_n$ bears to the required signal voltage $V_s$, that is, the voltage necessary to produce detonation. $V_n$ thus must at no time become equal to or greater than $V_s$. Further, a margin of safety should be provided; that is, the safety factor, $f$, should at least be equal to 5. That is, $$(4) \qquad f = \frac{V_s}{V_n} = 5$$

Calculations and actual tests with existing equipment have shown that $f$ may at times be as low as .75. The charge 5 will, therefore, suffer premature detonation due to torpedo motion.

From the analysis just made of a single coil device, showing premature detonation, it is not to be inferred that such a device lacks utility. The device would be of utility in a torpedo, the motion of which is accurately controlled, or, if the field device is itself preferably gyroscopically stabilized on a vehicle, as an aircraft, then the device can be utilized to map the magnetic gradient of the earth's field.

The foregoing analysis does, however, show that with the gyroscopically controlled and penduously controlled steering equipment now used for torpedoes the single coil device is not practical.

In a device which is sensitive to field gradients only, providing the two elements needed for such a gradiometer are precisely identical, motion of the gradiometer in a uniform field will not produce any signal voltage. Only motion of the gradiometer through a non-uniform field, such as exists in the neighborhood of a target, will produce a signal voltage. This non-uniform gradient is shown by the curve 6 in FIG. 4 and represents the signature of a destroyer. Generally stated, such a device, or gradiometer consists of a pair of magnetic rods, as 7 and 8 shown in FIG. 3. These rods must be magnetically as near alike as possible. Each rod is surrounded by at least one coil, which coils 9 and 10 have as near as possible identical mechanical and electrical characteristics, have common axes with their respective rods and are electrically connected in opposition, and the axes of the rods are mounted so that they are perfectly parallel.

Such a gradiometer may have its two elements disposed in any one of nine possible position relations as shown by $(a)$, $(b)$, $(c)$, $(d)$, $(e)$, $(f)$, $(g)$, $(h)$ and $(i)$ in FIG. 2.

For the rod and coil elements disposed in any one of these nine positions, the voltage induced, or the signal voltage, is proportional to the time rate of change of the appropriate field gradient, and is expressed by $$(5) \qquad V_s = K_2 d \frac{\left(\frac{dH_{xi}}{dx_j}\right) dx_j}{dt}$$

where $dx_j$ is the distance between the two rods. The meaning of the other quantities is apparent from the above discussion of the single rod-coil.

A target ship for all practical purposes may be regarded as being infinitely long in the X direction. From this approximation, it is evident that the X component of the ship's field, and any gradient in the X direction, are negligibly small. This consideration rules out, on the basis of lack of sensitivity for torpedo detonator operation, possibilities $(a)$, $(b)$, $(c)$, $(d)$, and $(e)$ of FIG. 2.

The four remaining possibilities, for given coil-rod dimensions and separation, are largely of the same sensitivity as far as external gradient due to targets are concerned. However, the external gradients are not the only factors in need of consideration. A torpedo, usually constructed of a steel shell and other steel parts, is a magnetic body. Further, in an electric torpedo, in which our device at present finds its use, the electric motor M, and the electric currents flowing in the various circuits also produce internal gradients. These internal gradients arise from effective dipoles represented by the arrows $P_x$, $P_y$ and $P_z$ and are effects that must be eliminated.

When the four remaining possibilities are compared as to sensitivity to internally produced gradients, all four are affected alike by internal sources of magnetic disturbance, though each is affected by different sources which themselves are different in magnitude. By means of the use of compensating disturbances equal and opposite to $P_x$, $P_y$ and $P_z$, it has been found for the electric torpedo now in use that arrangements ($h$) and ($i$) are preferable to arrangement ($f$) and ($g$).

From Equation 5, for a torpedo moving in the Y direction, the signal voltage is (6) $$V_s = Kv\left(\frac{d^2 H_{xi}}{dy dx_j}\right) dx_j$$

In order to obtain a gradiometer of maximum sensitivity, we must make the effective permeability, the area turns, and the separation between the coil-rods as large as possible. From such elementary considerations of the noise sources, the sensitivity, the space available in the warhead of a torpedo, and the relative ease of mounting of the gradiometer elements, it is apparent that arrangement ($i$) is the most preferable to obtain an output voltage equal to the signal voltage necessary to fire the torpedo. The structural details of the two arrangements selected are shown in FIGS. 5, 6, 7, 10 and 11. However, before discussing the structural details some further theoretical features need be discussed.

A gradiometer as just discussed, subject to field gradients only, still leaves out of consideration limitations of manufacture. No amount of care in the manufacturing process will produce identical rods, identical coils, absolutely parallel rod axes, etc. This means that in addition to the internal sources of magnetic disturbance which arise from gradients due to torpedo components, if the gradiometer elements are not exactly balanced, or are not absolutely parallel, output voltage components will be produced due to the rotation of the gradiometer in the earth's uniform field. The allowable voltage component due to this noise determines the degree of balance required.

This noise voltage output component will, in the same manner as for the single rod coil device, but to a considerably lesser average magnitude, depend on the rotation of the torpedo. The more nearly the coil and rod components are balanced, and the more nearly parallel they are the more insignificant the noise voltage becomes.

With the various movable magnetic means provided in the actual construction in the three axes X, Y and Z for adjusting the balance, a safety factor of 5 is readily obtained.

While a steel warhead can be used, such a steel warhead introduces further complications since it is known that steel changes its magnetic characteristics with time from a variety of causes. The apparatus may thus not be stable except in a warhead of a metal other than steel.

In devising our pratical structures, we selected a bronze warhead, first, to keep the gradiometer as independent of the torpedo structure as possible, second, to keep its enivronment as non-magnetic as possible, third, keep the gradiometer as symmetric as possible with respect to nearby electric current conducting objects, and, fourth, to give it good mechanical stability.

In FIGS. 5, 6 and 7, and 10 and 11, respectively, we show two types of gradiometer structures. These will be described separately, since the structure differ considerably in detail and the methods of balancing are quite different in the two cases.

In FIGS. 5, 6 and 7 we show the first structural gradiometer actually investigated. This structure comprises a pair of vertically disposed beams 11 and 12 of bronze, copper, or similar non-magnetic metal having upper and lower half-round bearing ends 13 and 14, and 15 and 16, respectively. Mating half-round bearing pieces 17 and 18, and 19 and 20 are bolted to the ends 13 and 14, and 15 and 16, respectively, and firmly hold tubes 21 and 22 made of hard non-magnetic electric insulation material, such as rubber, a textile material impregnated with a phenolic condensation product, neoprene, or some other natural or synthetic resinous material.

The arrangement of the tubes 21 and 22 is such that their axes are as near parallel as careful manufacture can make them. The aft ends are closed by caps 31 and 32 of the same type of material as the tubes.

The half-round bearing pieces 13, 14, 15 and 16 have flanges 23, 24, 25 and 26, respectively. For rigidly securing the beams 11 and 12 in the bronze warhead 27 of the torpedo, the beams are provided with a pair of reinforcing tubes 28 and 29 or bronze or some other strong non-magnetic metal, to give the entire structure rigidity.

The magnetic elements of the gradiometer comprise two ½" rods as the rod 30 shown at the bottom of FIG. 5. The rods are made of an iron-nickel alloy having a relatively high permeability. These rods are each provided with end pieces, as 33 and 34, of substantially chemically pure iron to aid in collecting, so to speak, the lines of force of the magnetic field, that is, for increasing the permeability of the magnetic paths.

Each rod has a 200,000 turn coil wound about it. Each coil is made up of four coils connected in series each of 50,000 turns each, wound on textile spools impregnated with a phenolic condensation product. The coils 200 and 201 on the two rods are connected in opposition so that the voltage output to the amplifier A, discussed hereinafter, is a function of the magnetic gradient only, disregarding for the moment the errors that are introduced by the manufacturing limitations.

Since the coils are not perfectly balanced, the rods not perfectly parallel, and since there are internal disturbances, capacity effects, and eddy current effects in the system, means have to be provided to get a high degree of balance.

In practice the rods are tested and the coils are tested and like rods and like coils only are used in a given gradiometer to, at the outset, improve the balance.

The longitudinal magnetic balance, namely the balance in the Y axis is obtained by variations of the effective length of one or the other of the rods. Each aft end cap of the chemically pure iron has a threaded plug as 35 about an inch in diameter and about one-and-a-quarter inches long which can be screwed in or out, and clamped in position by a lock-nut 36. By this proper pairing of coils and rods and the plugs 35, it is possible to keep the initial unbalance in the Y axis extremely small. To keep the coil-rod assembly in proper axial relation to the tubes 21 and 22 at each right-hand end just to the left of the end pieces, as 33, the rods are provided with cylindrical guide blocks, as 33', of the same or other insulating material as the tube. These guide blocks have free sliding engagement with the inner surfaces of the tubes 21 and 22 to center the rods and yet permit stress-free movement of the right-hand end.

The magnetic balance in the X axis is obtained with the threaded magnetic headless bolt 37 disposed in the X direction transverse of the forward end pieces 34. For the particular structure the bolt may be about one-quarter of an inch in diameter and of sufficient length to protrude beyond the end pieces so that the bolts may be readily shifted transverse of the end pieces. With these bolts and the accurate construction of the parts and the colinear positioning of the rods 21, the unbalance in the X direction may be made extremely small.

The magnetic balance in the Z axis is attained with the slabs 38 and 39 of magnetic metal adjustably fastened to the front of the forward end pieces 34. These slabs 38 and 39 can be independently moved parallel to the Z axis and clamped in position by the bolts 40 and 41.

The Z axis unbalance arises from asymmetry with respect to the XZ plane, which in a torpedo is quite marked, since the torpedo body aft of the gradiometer is steel while no steel exists forward of the warhead rear bulkhead. By the use of the relatively large slabs and the wide range of adjustment provided for the slabs, it is, nevertheless, possible to keep the unbalance extremely low.

Because of the marked dependence of the Z balance on the rest of the torpedo, the gradiometer should preferably be adjusted in the presence of the torpedo.

Still other unbalance conditions are present of which the eddy current unbalance is of sufficient magnitude to require compensation. The eddy current unbalance effects are nullified by means of a pair of copper rings 43 and 44 which are arranged on the tubes 21 and 22 so that the rings may be slid along the tubes to such positions that eddy current balance is obtained. Once in correct position the rings may be locked in position by suitable set screws. The upper ring 43 shows one of these set screws, as 45.

Since the various balance ratios are all slightly dependent on frequency and amplitude, the adjustments to improve the balance should, therefore, be made at the known frequencies of gyration and known amplitudes of gyration encountered in practice.

It will be noted from the foregoing that the gradiometer structure shown in FIGS. 5, 6, and 7, is an independent structure which is balanced before final installation. At final installation it is mounted in the warhead 27 as shown in FIG. 7. The central brass supporting pipe 46 is brazed into the front bulkhead 47 at 48 and the warhead is then closed by brazing in the rear bulkhead 42. After the warhead is complete, the gradiometer is no longer available for further adjustments.

The warhead is then filled with torpex. The torpex flows into intimate contact with all the outside surfaces of the gradiometer structure and the latter is thus firmly held in position by the solid mass of the torpex charge.

The region forward of the front bulkhead 47 houses the amplifier A for the gradiometer, the amplifier being connected to the leads 49 and 50 extending from the coils to the amplifier.

The region forward of the bulkhead 47 also houses the inertia detonating device; the turbine driven transmission mechanisms for arming the warhead after the torpedo is a safe distance from the launching craft, and other devices.

One of the disadvantages of the type of gradiometer just discussed is that the gradiometer has to be mounted before the charge is put in the warhead and, further, after it is mounted, it is no longer available for adjustments.

The gradiometer structure shown in FIGS. 10 and 11 eliminates these disadvantages.

In FIG. 10 we show a pair of brass tubes 50' and 51 brazed to the rear of the front bronze bulkhead 52. These tubes are firmly held in parallel relation by a brass web 53. The aft ends of the tubes 50' and 51 are closed by the brass caps 54 and 55 which have forwardly directed recesses for slidably receiving the aft ends of the rods 56 and 57. The recesses are accurately positioned relative to each other so that they, with the forward supports in the bulkhead 52, comprising a brass casting, hold the rods parallel and yet permit longitudinal expansion of the rods. The rods thus are at no time stressed to alter the magnetic balance.

The forward supports of the rods comprise apertured disks 58 and 59 of insulating material firmly disposed in the adapters 60 and 61 secured to the casting 52. With this arrangement it will be apparent that the rods 56 and 57 and coils 62 and 63 disposed on the rods may be inserted and removed from the front of the tubes 50' and 51.

The Z balance is obtained by means of a pair of chemically pure iron rods 64 and 65 which can be independently vertically adjusted in the block 66 of similar metal thus varying the effective length of this block 66. When the Z adjustment has been made, the rods 64 and 65 are locked in position by suitable set screws 67 and 68.

The adjustment for X balance is obtained by suitable transverse adjustment of the transverse rods 69 and 70 disposed in holes in the forward ends of the rods 56 and 57. The rods 69 and 70, once adjusted, may be locked in position by the set screws shown.

The Y balance is obtained electrically. This will appear hereinafter from a discussion of circuits used with the gradiometer shown in FIG. 12.

The gradiometer shown in FIG. 10 is operated from dry cells $B_1$ and $B_2$ located in the compartment 72 to the front of the partition 71 secured to casting 52 as shown. This compartment also houses the amplifier and generally the same equipment shown in FIG. 7.

The use of dry cells removes the noise due to the voltage fluctuations of the main propulsion battery. This means greater amplification can be used. With this arrangement about 2200 amplifications can be obtained. This gain in amplification obviates the necessity for end caps on the rods. Further, each coil now needs only 140,000 turns. The overall diametrical coil dimensions are thus smaller.

From the structural features discussed for the gradiometer shown in FIGS. 10 and 11, all adjustments are made after the head is completely assembled, and filled if desired. In any case, the balance can be checked and readjusted if necessary after filling of the warhead, and at any advance base, where relatively simple test equipment should usually be available. Since such checks can be made on location, the danger of the balance going bad during shipping is not so serious as for the gradiometer shown in FIGS. 5, 6 and 7.

The Y balance, including elimination of the eddy current effects, or components, is obtained electrically by the means of a pair of low resistance coils 73 and 74 of relatively few turns, as 108 turns. See FIG. 12. These two coils 73 and 74 are disposed, respectively, on the rods with the main coils 62 and 63. The coils 73 and 74 are connected, as shown in FIG. 12, in series with a suitable wire wound potentiometer 75. One or the other coil may be more or less short-circuited by proper adjustment of the potentiometer slider 76 to thus alter the effect of the coils to obtain eddy current balance. The magnetic component of unbalance is eliminated by adjustment of the high resistance potentiometer 77 in series with coils 62 and 63.

The output voltage of coils 62 and 63 is of course the differential voltage of the coils. This is apparent from the connection shown in FIG. 12. The output voltage from leads 78 and 79, shunted by the condenser 80 is supplied to the electronic part of the exploder. This includes (1) an amplifier of suitable gain for the type of signal encountered, to thus step up the signal to the five volts necessary to fire the thyratron tube 303 which a selected time later fires the tube 305 which in turn fires the tetryl charge in the caps, (2) a time delay circuit, and (3) anti-countermining and ceiling switches which prevent the exploder from being operated by shocks ensuing from neighboring explosions or from broaching. The ceiling switch in addition renders this magnetic influence exploder inoperative for contact-depth shots.

Since the requirements of the electronic circuits are somewhat different for the two gradiometers disclosed, the brief discussion but somewhat more detailed than here stated of the circuits for each will be done separately.

Before discussing the amplifier circuit, a brief reference to certain parts of the system of control of the torpedo, per se no part of our invention, need be made. For a more complete discussion of said certain parts of the system of control, reference may be had to the application of Henry V. Putman et al. Serial No. 550,249, filed August 19, 1944, now Patent No. 2,419,164 and entitled Control Apparatus.

Before the torpedo is fired, the manually operable switch 100 is closed to positively energize conductor 101 from the positive battery terminal 99. The instant the torpedo is fired, the trigger switch T closes by the action of the dog D in the firing tube on the trigger switch. A circuit is thus established from the positive conductor 101 through the trigger switch to the coil 102 of the gyroscopic declutching mechanism 103 and through the switch 104 of the gyrostat releasing mechanism 105. This releasing mechanism operates a short time thereafter to close the contacts 106 whereupon a circuit is established for the main starting contactor SC. This circuit may be traced from the positive battery terminal 99 through the normally closed contacts 107 of a stop switch, the actuating coil of the starting contactor SC, the closed contacts of the overspeed relay 108 and contacts 106 to the negative terminal of the battery. As soon as the starting contactor is operated to close the contacts 109, a circuit is established to energize conductors 169 and 170.

The amplifier circuit as connected to the coils 200 and 201 is shown in FIG. 9. The amplifier is of the high resistance type producing through two stages an amplification of 500 times the input. In a very general sense the amplifier is conventional but care must be exercised by those skilled in the art in selecting the elements. The operation will be readily understood by those skilled in the art from the brief discussion following.

A short time after the main starting contactor SC has closed its contacts 109, after firing of the torpedo, an energized condition is established from the positive or one-hundred-and-twenty volt terminal of the battery through contacts of the main starting contactor SC to conductor 169, through the adjustable resistor 171 and the resistor 172 to conductor 173. The adjustable resistor 171 and the resistor 172 have their resistance value so selected that there is a one-hundred-and-two volt drop to conductor 173. The conductor 173 may thus be designated the eighteen volt conductor.

From this eighteen volt conductor, the circuit is completed through the filament 175 for heating the cathode 174 of the thyratron tube 176, to the twelve-volt conductor 177, through the filament 179 for heating the cathode 178 of the thyratron tube 180 to the six-volt conductor 181, through filaments 182 for heating the cathodes 183 and 184 of the evacuated two-stage amplifier tube 186 to the zero voltage conductor 170 connected to the negative or zero volt terminal of the battery.

Specific values of voltage are merely given in this specification to facilitate understanding of the discussion. The circuit voltage values and other constants may, of course, be chosen to have substantially any values desired provided the proper relations are maintained.

Since the actual voltage induced in the coils 200 and 201 is rather small and voltage surges other than the noise voltages already discussed may take place it is apparent that the amplifier and the associated circuits including resistors and capacitors can not be picked at random. The selection of the constants for the various elements must take into account the signature characterisics of the target. FIG. 4 shows a typical signature of a destroyer. The signature of other type vessels is not so different that one circuit arrangement with properly selected characteristics will not suffice. The person skilled in the art with the aid of our disclosure will have no difficulty in selecting the electronic equipment and capacitors to effect the desired filtering and amplification.

The tube 191 is a twin-diode evacuated rectifier tube utilized for the purpose of blocking the firing, or discharge of tube 189. This will be hereinafter explained more in detail. To assure that tube 191 is properly heated soon after the torpedo is fired, the filaments 192 and 193 are connected across conductors 181 and 170, which is a circuit in parallel to the filament of the tube 180. The filaments 192 and 193 heat the cathodes 194 and 195, respectively.

The tube VR is the voltage regulating tube and is used to keep constant voltage on the amplifier circuit, the time delay tube 180, the anti-countermining tube 191 and circuit, and the thyratron tube 176 for actually firing the tetryl charge.

A scrutiny of the gradient signature shown in FIG. 4 indicates that a firing signal will, in general, be obtained near the first rail of the target. To better localize the explosion, it is desirable to introduce a time delay between this point and the explosion to thus get the torpedo closer to the keel of the target vessel. A time delay of a half-second is usually sufficient. The time delay tube and its circuit are designed to delay the signal just the right amount of time regardless of whether the signal is positive or negative. The signal is thus passed to the grid of the thyratron tube at the right time to cause firing of this thyratron tube 176.

The anti-countermining circuit is needed for two reasons. First, the magnetic elements of the exploder are sensitive to changes in magnetization in the torpedo caused by underwater explosions as much as a mile away. Second, if the torpedo broaches, the motion is so violent that the balance ratios are not small enough to protect the system, and also the shock of falling back into the water may affect the exploder in the same manner as nearby underwater explosions. The anti-countermining circuit provides protection against both of these eventualities.

A light normally-closed switch 114 operating on about 2 g is mounted directly on the warhead shell so as to be exposed to incident shock waves in the water. Normally the shield grid 111 of tube 180 is connected to its cathode through the tube 191 and associated resistor 196. The shield grid is thus held at the cathode potential. If the anti-countermining circuit is opened momentarily by the opening of switch contacts 114, the condenser 197 charges in an extremely short time bringing the shield grid down to zero volts. This negative voltage, with respect to the cathode, on the shield grid blocks the tube and no signal can be transmitted to the thyratron tube 176.

After the shock is past the switch releases, but the condenser 197 cannot discharge through the tube but now discharges through the five megohm resistor 198. The time of discharge is thus long enough to permit all disturbance to have died down. When the condenser 197 has completely discharged, no further blocking of tube 180 takes place and the signal can again be transmitted to the thyratron tube 176. If the torpedo broaches, the function is the same since the hydrostatically operated ceiling switch 115, which is normally closed, is in series with switch 114.

The arming switch 199 is operated from the gear sector S operated by a small impeller wheel driven by the slip stream and usually does not close until the torpedo is some three hundred yards distant from the submarine. Since the arming switch is in series with the firing circuit of both the thyratron tube 176 and the inertia, or impact, switch 300 firing under no circumstances can take place until the arming switch 199 is closed.

The electronic circuit for the warhead, shown in FIG. 10 and FIG. 11 and operating from dry cells $B_1$ and $B_2$, in the main, functions like the electronic circuit shown in FIG. 9, but since the voltage of the dry cells is normally constant, no voltage regulating tube is necessary and since over 2000 amplifications can be used, two separate amplifying tubes 301 and 302 are used.

As seen from FIG. 4 the signature of a vessel at one rail may be predominately positive. By the amplifier we use namely a high-resistance amplifier, a uni-directional voltage pulse from the pick-up coils produces a bi-directional response. In FIG. 13 we show the response that may be expected from a purely theoretic standpoint by step-voltage impulses 160 and 161 of .01 volt of .1 second and .2 second duration. It will be noted that the response is first positive and then negative as indicated by portions 162 and 163, and 164 and 165, respectively.

Experimental investigation revealed a response as shown by curve 166 of FIG. 14. The resemblance of the curves of FIG. 13 with the curve of FIG. 14 is quite evident.

Since a bi-directional response is obtained it is apparent that the function of our electronic systems are quite independent of the gradient signature polarity.

The tube 303 provides the required time delay and tube 304 functions to block the signal to the cold cathode firing tube 305 in the event of relatively nearby underwater explosions or broaching of the torpedo.

The sequence of arming is controlled by the rotation of the sector S. At a movement of the torpedo of about twenty-five yards, switch 306 is closed and the filaments of the various tubes are heated. At some two-hundred and fifty yards, the arming solenoid is energized by the closing of contacts 307. At about two-hundred-and seventy-five yards, the contacts 308 open and at about three hundred yards, contacts 309 close to completely arm the torpedo.

In the modification shown in FIG. 3, we show the gradiometer rods as being provided with coils 81 and 82 respectively, connected to a polarizing battery 83. The pick-up coils 9 and 10 are connected in opposition and in series with a battery 84 and the grid and cathode of the tube 85. The coils 89 and 90 are similarly connected in opposition and then in series with the battery 86 and grid and cathode of the tube 87.

If a positive signal is induced in the coils first as by the first positive region on the signature, the bias on the grid tube will cause tube 85 to break down and a current will flow from battery 95 through the tube 85, the coil 88 of the solenoid and contacts 96 back to the battery. The solenoid will thus operate the armature 91 counter-clockwise on pivot 92 and to close contacts 93. A moment later when the induced voltage is reversed as by the negative region R of the signature tube 87 will become conducting with the result that a current will now flow from the positive terminal of battery 95 through tube 87, the detonating cap 94 and contacts 93 back to the battery. If a negative signal is received first, then solenoid 97 is first energized to close contacts 98 whereupon the positive portion of the signature following a moment later will explode the cap 110.

It can be readily seen that the arrangement shown in FIG. 3 will operate satisfactorily within a few feet from an unmagnetized body of magnetic material and will also operate when passing a polarized magnetic object independent of the polarity. A distant source of magnetic field will not affect the gradiometer. Further, by making the device operate always on the second, or R region of the signature, the device will not operate prematurely, namely on the first change in voltage, but only on the second and thus fire the charge when the torpedo is near the keel of the target vessel and not before reaching a position below the rail.

The showing in FIG. 3 illustrates the firing tubes directly in the circuit of the gradiometer coils. With the use of standard tubes available on the market, an amplifying circuit would, of course, have to be used between the coils and the tubes.

While we have shown and described but few embodiments we are aware that others, particularly after having had the benefit of our teachings, may devise other arrangements for detonating torpedoes through changes of the magnetic field in proximity of a torpedo. We, therefore, do not wish to be limited to the specific showing made but wish to be limited only by the scope of the claims hereto appended.

We claim as our invention:

1. In a device for detonating the main charge of explosive in the warhead of a torpedo, in combination, a pair of solenoids, cores of magnetic material for said solenoids, said solenoids and their cores being so selected that they have like electric and magnetic properties and being disposed on the torpedo so that their axes are in parallel relation to each other, said solenoids being connected in opposition so that the total current induced in the solenoids, as the torpedo moves through the water and thus through the earth's magnetic field, is a function of the magnetic gradient, a booster charge for the main charge and of the type that is fired by an electric current of predetermined magnitude, a source of electric energy for supplying the electric current of predetermined magnitude, and means responsive to a predetermined total current induced in said solenoids resulting from a given change in magnetic gradient, for connecting the source of energy to the booster charge.

2. In a device for detonating the main charge of explosive in the warhead of a torpedo, in combination a pair of solenoids, cores of magnetic material for said solenoids, means for polarizing said solenoids, said solenoids and their cores being so selected that they have like electric and magnetic properties and being disposed on the torpedo so that their axes are in parallel relation to each other, said solenoids being connected in opposition so that the total current induced in the solenoids, as the torpedo moves through the water and thus through the earth's magnetic field, is a function of the magnetic gradient, a booster charge for the main charge and of the type that is fired by an electric current of predetermined magnitude, a source of electric energy for supplying the electric current of predetermined magnitude, and means responsive to a predetermined total current of a given polarity induced in said solenoids, resulting from a given change in magnetic gradient, for connecting the source of energy to the booster charge.

3. In a device for detonating the main charge of explosive in the warhead of a torpedo, in combination, a non-magnetic warhead, a pair of solenoids, cores of magnetic material for said solenoids, said solenoids and their cores being selected to have as near like electric and magnetic characteristics as careful selection can make the characteristics alike, said solenoids and their cores being disposed in the warhead so that their axes are substantially in parallel relation to each other, said solenoids being connected in opposition so that the total current induced in the solenoids, as the torpedo moves through the water and thus through the earth's magnetic field, is a function of the magnetic gradient, a booster charge for the main charge of the type that is fired by an electric current of predetermined magnitude, a source of electric energy for supplying the electric current of predetermined magnitude, and means responsive to a predetermined total current induced in the said solenoids, resulting from a given change in magnetic gradient, for connecting the source of energy to the booster charge.

4. In a device for detonating the main charge of explosive in the warhead of a torpedo, in combination, a non-magnetic warhead, a pair of solenoids, cores of magnetic material for said solenoids, said solenoids and their cores being selected to have as near like electric and magnetic characteristics as careful selection can make the characteristics alike, means for altering both the magnetic and electric characteristics to make them more nearly alike than is attained by selection, only, said solenoids and their cores being disposed in the warhead so that their axes are substantially in parallel relation to each other, said solenoids being connected in opposition so that the total current induced in the solenoids, as the torpedo moves through the water and thus through the earth's magnetic field, is a function of the magnetic gradient, a booster charge for the main charge of the type that is fired by an electric current of predetermined magnitude, a source of electric energy for supplying the electric current of predetermined magnitude, and means responsive to a predetermined total current induced in the said solenoids, resulting from a given change in magnetic gradient, for connecting the source of energy to the booster charge.

5. In a device for detonating the main charge of explosive in the warhead of a torpedo, in combination, a non-magnetic warhead, a pair of solenoids, cores of magnetic material for said solenoids, said solenoids and their cores being selected to have as near like electric and magnetic characteristics as careful selection can make the characteristics alike, said solenoids and their cores being disposed in the warhead so that their axes are substantially in parallel relation to each other, means for adjusting the magnetic and electric characteristics of the solenoid assembly to compensate for any slight non-parallel disposition of the solenoids and their cores resulting from manufacturing limitations, said solenoids being connected in opposition so that the total current induced in the solenoids, as the torpedo moves through the water and thus through the earth's magnetic field, is a function of the magnetic gradient, a booster charge for the main charge of the type that is fired by an electric current of predetermined magnitude, a source of electric energy for supplying the electric current of predetermined magnitude, and means responsive to a predetermined total current induced in the said solenoids, resulting from a given change in magnetic gradient, for connecting the source of energy to the booster charge.

6. In a device for detonating the main charge of explosive in the warhead of a torpedo, in combination, a non-magnetic warhead, a pair of solenoids, cores of magnetic material for said solenoids, said solenoids and their cores being selected to have as near like electric and magnetic characteristics as careful selection can make the characteristics alike, means for altering both the magnetic and electric characteristics to make them more nearly alike than is attained by selection, only, said solenoids and their cores being disposed in the warhead so that their axes are substantially in parallel relation to each other, means for adjusting the magnetic and electric characteristics of the solenoid assembly to compensate for any slight non-parallel disposition of the solenoids and their cores resulting from manufacturing limitations, said solenoids being connected in opposition so that the total current induced in the solenoids, as the torpedo moves through the water and thus through the earth's magnetic field, is a function of the magnetic gradient, a booster charge for the main charge of the type that is fired by an electric current of predetermined magnitude, a source of electric energy for supplying the electric current of predetermined magnitude, and means responsive to a predetermined total current induced in the solenoids, resulting from a given change in magnetic gradient, for connecting the source of energy to the booster charge.

7. In a device for detonating a torpedo by the proximity of a magnetic target which thus produces a distortion of the earth's magnetic field, that is, has, in terms of the art, a gradient signature, in combination, a pair of like electric coils disposed in parallel relation to each other and disposed in the torpedo parallel to the torpedo axis, said coils being connected in opposition so that the voltage induced is a function of the magnetic gradient, an amplifying circuit interconnected with the coils, and torpedo detonating means responsive to a given voltage impulse of the amplifying means for detonating the torpedo.

8. In a detonating control for a torpedo, including, means responsive to the magnetic gradient of the magnetic field encountered by a torpedo during its movement through the water, said means including, a pair of rods of magnetic material, said rods being selected as near alike in physical length and magnetic length as may be done by careful selection and disposed in the warhead of a torpedo in spaced relation to each other and both as near in parallel relation to the torpedo axis as manufacturing tolerances will permit, an electric coil on each rod thus forming two coil-rod assemblies, the coils having physical and electrical characteristics as near alike as can be obtained by careful construction, said coils being connected in opposition in a closed circuit to thus produce voltages as a function of the magnetic gradient encountered by the coils during movement of the torpedo, means at one end of each coil-rod assembly to adjust the relative magnetic length of the two coil-rod assemblies so that any differences in their axial electromagnetic characteristics may be reduced to a minimum, means disposed at the front of each coil-rod assembly for matching both the vertical and horizontal magnetic fields at the front of the coil assemblies to those at the back by reason of the presence of magnetic components inherent in a torpedo, and means responsive to a selected effective voltage induced in the coils for detonating the torpedo.

9. In an electric control system, in combination, a mounting base which in normal operation moves in a given direction through the earth's magnetic field, a pair of electromagnetically substantially alike solenoids disposed in fixed parallel relation to each other, disposed in fixed relation on the base, and connected in opposition to each other so that the total voltage effect of both said solenoids together is the algebraic sum of the individual voltage effects of said solenoids, whereby a measurable total voltage effect will be produced only by said solenoids at points of distortion of the earth's magnetic field, an electric circuit, control means responsive to said measurable total voltage effect for altering the energization of said electric circuit, and means responsive to predetermined changes in pressure within the medium through which said base is moving for preventing any changes in the energization of said electric circuit during the interim of said pressure changes.

10. In an electric control system for a torpedo which during normal operation a predetermined period after being fired proceeds through the sea at a given depth and speed in a given horizontal direction to thus proceed through the earth's magnetic field at a substantially fixed speed, in combination, a pair of like rods of magnetic material disposed in as near parallel relation to each other as accurate mounting will permit to provide magnetically balanced rods and disposed on the torpedo so as to have a fixed relation to the torpedo axis, an electric coil on one rod, an electric coil of the same number of turns and same mechanical and electrical characteristics on the other rod, said second coil being connected in opposition to said first coil whereby the output of said coils together is a function of the algebraic sum of the individual outputs of the coils separately, whereby an output current appears only at regions of distortion of the earth's magnetic field, means for changing the relative magnetic lengths of said rods to improve the axial magnetic balance thereof, an electric circuit, and means responsive to the output current of said coils for controlling the energization of said circuit.

11. In an electric control system for a torpedo which during normal operation a perdetermined period after being fired proceeds through the sea at a given depth and speed in a given horizontal direction to thus proceed through the earth's magnetic field at a substantially fixed speed, in combination, a pair of like rods of magnetic material disposed in as near parallel relation to each other as accurate mounting will permit to provide magnetically balanced rods and disposed on the torpedo so as to have a fixed relation to the torpedo axis, an electric coil on one rod, an electric coil of the same number of turns and same mechanical and electrical characteristics on the other rod, said second coil being connected in opposition to said first coil whereby the output of said coils together is a function of the algebraic sum of the individual outputs of the coils separately, whereby an output current appears only at regions of distortion of the earth's magnetic field, means for changing the relative magnetic lengths of said rods to improve the axial magnetic balance thereof, means for improving the horizontal magnetic balance of said rods, an electric circuit, and means responsive to the output current of said coils for controlling the energization of said circuit.

12. In an electric control system for a torpedo which during normal operation a predetermined period after being fired proceeds through the sea at a given depth and speed in a given horizontal direction to thus proceed through the earth's magnetic field at a substantially fixed speed, in combination, a pair of like rods of magnetic material disposed in as near parallel relation to each other as accurate mounting will permit to provide magnetically balanced rods and disposed on the torpedo so as to have a fixed relation to the torpedo axis, an electric coil on one rod, an electric coil of the same number of turns and same mechanical and electrical characteristics on the other rod, said second coil being connected in opposition to said first coil whereby the output of said coils together is a function of the algebraic sum of the individual outputs of the coils separately, whereby an output current appears only at regions of distortion of the earth's magnetic field, means for changing the relative magnetic lengths of said rods to improve the axial magnetic balance thereof, means for improving the vertical magnetic balance of said rods, an electric circuit, and means responsive to the output current of said coils for controlling the energization of said circuit.

13. In an electric control system for a torpedo which during normal operation of predetermined period after being fired proceeds through the seal at a given depth and speed in a given horizontal direction to thus proceed through the earth's magnetic field at a substantially fixed speed, in combination, a pair of like rods of magnetic material disposed in as near parallel relation to each other as accurate mounting will permit to provide magnetically balanced rods and disposed on the torpdeo so as to have a fixed relation to the torpedo axis, an electric coil on one rod, an electric coil of the same number of turns and same mechanical and electrical characteristics on the other rod, said second coil being connected in opposition to said first coil whereby the output of said coils together is a function of the algebraic sum of the individual outputs of the coils separately, whereby an output current appears only at regions of distortion of the earth's magnetic field, means for changing the relative magnetic lengths of said rods to improve the axial magnetic balance thereof, means for improving the horizontal magnetic balance of said rods, means for improving the vertical magnetic balance of said rods, an electric circuit, and means responsive to the output current of said coils for controlling the energization of said circuit.

14. In an electric control system for a torpedo which during normal operation a predetermined period after being fired proceeds through the sea at a given depth and speed in a given horizontal direction to thus proceed through the earth's magnetic field at a substantially fixed speed, in combination, a pair of like rods of magnetic material disposed in as near parallel relation to each other as accurate mounting will permit to provide magnetically balanced rods and disposed on the torpedo so as to have a fixed relation to the torpedo axis, an electric coil on one rod, an electric coil of the same number of turns and same mechanical and electrical characteristics on the other rod, said second coil being connected in opposition to said first coil whereby the output of said coils together is a function of the algebraic sum of the individual outputs of the coils separately, whereby an output current appears only at regions of distortion of the earth's magnetic field, means for improving the horizontal magnetic balance of said rods, an electric circuit, and means responsive to the output current of said coils for controlling the energization of said circuit.

15. In an electric control system for a torpedo which during normal operation a predetermined period after being fired proceeds through the sea at a given depth and speed in a given horizontal direction to thus proceed through the earth's magnetic field at a substantially fixed speed, in combination, a pair of like rods of magnetic material disposed in as near parallel relation to each other as accurate mounting will permit to provide magnetically balanced rods and disposed on the torpedo so as to have a fixed relation to the torpedo axis, an electric coil on one rod, an electric coil of the same number of turns and same mechanical and electrical characteristics on the other rod, said second coil being connected in opposition to said first coil whereby the output of said coils together is a function of the algebraic sum of the individual outputs of the coils separately, whereby an output current appears only at regions of distortion of the earth's magnetic field, means for improving the horizontal magnetic balance of said rods, means for improving the vertical magnetic balance of said rods, an electric circuit, and means responsive to the output current of said coils for controlling the energization of said circuit.

16. In an electric control system for a torpedo which during normal operation a predetermined period after being fired proceeds through the sea at a given depth and speed in a given horizontal direction to thus proceed through the earth's magnetic field at a substantially fixed speed, in combination, a pair of like rods of magnetic material disposed in as near parallel relation to each other as accurate mounting will permit to provide magnetically balanced rods and disposed on the torpedo so as to have a fixed relation to the torpedo axis, an electric coil on one rod, an electric coil of the same number of turns and same mechanical and electrical characteristics on the other rod, said second coil being connected in opposition to said first coil whereby the output of said coils together is a function of the algebraic sum of the individual outputs of the coils separately, whereby an output current appears only at regions of distortion of the earth's magnetic field, means for improving the vertical magnetic balance of said rods, an electric circuit, and means responsive to the output current of said coils for controlling the energization of said circuit.

17. In an electric control system for a torpedo which during normal operation, a predetermined period after the torpedo is fired, or launched, proceeds through the sea on an even keel at a given depth and speed along a given horizontal path to thus proceed through the earth's normally constant magnetic field at a fixed speed, in combination, a rod of magnetic material disposed on the torpedo in parallel relation to the torpedo axis, a second rod of magnetic material disposed in spaced parallel relation to said first rod, said rods being balanced rods, that is, are selected as near alike in mechanical and magnetic characteristics as possible and so disposed on the torpedo that the rods fall in a vertical plane when the torpedo is on even keel, a solenoid coil wound on the first rod, a solenoid coil, having mechanical and electrical characteristics as near alike as manufacturing tolerances will permit, wound upon the second rod, said solenoid coils being connected in opposition so that the output current of said solenoid coils together is a function of the algebraic sum of the outputs of the coils individually, whereby an output current appears only at regions of a distortion of the earth's magnetic field, means for changing the relative magnetic lengths of said rods to obtain substantially exact axial magnetic balance of said rods, an electric circuit, an amplifier connected to said circuit and connected to amplify the output current of said solenoid coils to energize said circuit upon movement of the torpedo in proximity of a target that causes a distortion of the earth's magnetic field.

18. In an electric control system for a torpedo which during normal operation, a predetermined period after the torpedo is fired, or launched, proceeds through the sea on an even keel at a given depth and speed along a given horizontal path to thus proceed through the earth's normally constant magnetic field at a fixed speed, in combination, a rod of magnetic material disposed on the torpedo in parallel relation to the torpedo axis, a second rod of magnetic material disposed in spaced parallel relation to said first rod, said rods being balanced rods, that is, are selected as near alike in mechanical and magnetic characteristics as possible and so disposed on the torpedo that the rods fall in a vertical plane when the torpedo is on even keel, a solenoid coil wound on the first rod, a solenoid coil, having mechanical and electrical characteristics as near alike as manufacturing tolerances will permit, wound upon the second rod, said solenoid coils being connected in opposition so that the output current of said solenoid coils together is a function of the algebric sum of the outputs of the coils individually, whereby an output current appears only at regions of a distortion of the earth's magnetic field, magnetic means adjustable in a horizontal plane to obtain substantially exact horizontal magnetic balance of said rods, an electric circuit, an amplifier connected to said circuit and connected to amplify the output current of said solenoid coils to energize said circuit upon movement of the torpedo in proximity of a target that causes a distortion of the earth's magnetic field.

19. In an electric control system for a torpedo which during normal operation, a predetermined period after the torpedo is fired, or launched, proceeds through the sea on an even keel at a given depth and speed along a given horizontal path to thus proceed through the earth's normally constant magnetic field at a fixed speed, in combination, a rod of magnetic material disposed on the torpedo in parallel relation to the torpedo axis, a second rod of magnetic material disposed in spaced parallel relation to said first rod, said rods being balanced rods, that is, are selected as near alike in mechanical and magnetic characteristics as possible and so disposed on the torpedo that the rods fall in a vertical plane when the torpedo is on even keel, a solenoid coil wound on the first rod, a solenoid coil, having mechanical and electrical characteristics as near alike as manufacturing tolerances will permit, wound upon the second rod, said solenoid coils being connected in opposition so that the output current of said solenoid coils together is a function of the algebric sum of the outputs of the coils individually, whereby an output current appears only at regions of a distortion of the earth's magnetic field, magnetic means adjustable in a vertical plane to obtain substantially exact vertical magnetic balance of said rods, an electric circuit, an amplifier connected to said circuit and connected to amplify the output current of said solenoid coils to energize said circuit upon movement of the torpedo in proximity of a target that causes a distortion of the earth's magnetic field.

20. In an electric control system for a torpedo which during normal operation, a predetermined period after the torpedo is fired, or launched, proceeds through the sea on an even keel at a given depth and speed along a given horizontal path to thus proceed through the earth's normally constant magnetic field at a fixed speed, in combination, a rod of magnetic material disposed on the torpedo in parallel relation to the torpedo axis, a second rod of magnetic material disposed in spaced parallel relation to said first rod, said rods being balanced rods, that is, are selected as near alike in mechanical and magnetic characteristics as possible and so disposed on the torpedo that the rods fall in a vertical plane when the torpedo is on even keel, a solenoid coil wound on the first rod, a solenoid coil, having mechanical and electrical characteristics as near alike as manufacturing tolerances will permit, wound upon the second rod, said solenoid coils being connected in opposition so that the output current of said solenoid coils together is a function of the algebric sum of the outputs of the coils individually, whereby an output current appears only at regions of a distortion of the earth's magnetic field, a short-circuited conductor disposed about one solenoid coil, said conductor being axially adjustable to any position along the solenoid coil, a similar short-circuited conductor similarly adjustable disposed over the second solenoid coil, an electric circuit, an amplifier connected to said circuit and connected to amplify the output current of said solenoid coils to energize said circuit upon movement of the torpedo in proximity of a target that causes a distortion of the earth's magnetic field.

21. In an electric control system for a torpedo which during normal operation, a predetermined period after the torpedo is fired, or launched, proceeds through the sea on an even keel at a given depth and speed along a given horizontal path to thus proceed through the earth's normally constant magnetic field at a fixed speed, in combination, a rod of magnetic material disposed on the torpedo in parallel relation to the torpedo axis, a second rod of magnetic material disposed in spaced parallel relation to said first rod, said rods being balanced rods, that is, are selected as near alike in mechanical and magnetic characteristics as possible and so disposed on the torpedo that the rods fall in a vertical plane when the torpedo is on even keel, a solenoid coil wound on the first rod, a solenoid coil, having mechanical and electrical characteristics as near alike as manufacturing tolerances will permit, wound upon the second rod, said solenoid coils being connected in opposition so that the output current of said solenoid coils together is a function of the algebric sum of the outputs of the coils individually, whereby an output current appears only, at regions of a distortion of the earth's magnetic field, means for changing the relative magnetic lengths of said rods to obtain substantially exact axial magnetic balance of said rods, magnetic means adjustable in a horizontal plane to obtain substantially exact horizontal magnetic balance of said rods, an electric circuit, an amplifier connected to said circuit and connected to amplify the output current of said solenoid coils to energize said circuit upon movement of the torpedo in proximity of a target that causes a distortion of the earth's magnetic field.

22. In an electric control system for a torpedo which during normal operation, a predetermined period after the torpedo is fired, or launched, proceeds through the sea on an even keel at a given depth and speed along a given horizontal path to thus proceed through the earth's normally constant magnetic field at a fixed speed, in combination, a rod of magnetic material disposed on the torpedo in parallel relation to the torpedo axis, a second rod of magnetic material disposed in spaced parallel relation to said first rod, said rods being balanced rods, that is, are selected as near alike in mechanical and magnetic characteristics as possible and so disposed on the torpedo that the rods fall in a vertical plane when the torpedo is on even keel, a solenoid coil wound on the first rod, a solenoid coil, having mechanical and electrical characteristics as near alike as manufacturing tolerances will permit, wound upon the second rod, said solenoid coils being connected in opposition so that the output current of said solenoid coils together is a function of the algebric sum of the outputs of the coils individually, whereby an output current appears only at regions of a distortion of the earth's magnetic field, means for changing the relative magnetic lengths of said rods to obtain substantially exact axial magnetic balance of said rods, magnetic means adjustable in a vertical plane to obtain substantially exact vertical magnetic balance of said rods, an electric circuit, an amplifier connected to said circuit and connected to amplify the output current of said solenoid coils to energize said circuit upon movement of the torpedo in proximity of a target that causes a distortion of the earth's magnetic field.

23. In an electric control system for a torpedo which during normal operation, a predetermined period after the torpedo is fired, or launched, proceeds through the sea on an even keel at a given depth and speed along a given horizontal path to thus proceed through the earth's normally constant magnetic field at a fixed speed, in combination, a rod of magnetic material disposed on the torpedo in parallel relation to the torpedo axis, a second rod of magnetic material disposed in spaced parallel relation to said first rod, said rods being balanced rods, that is, are selected as near alike in mechanical and magnetic characteristics as possible and so disposed on the torpedo that the rods fall in a vertical plane when the torpedo is on even keel, a solenoid coil wound on the first rod, a solenoid coil, having mechanical and electrical characteristics as near alike as manufacturing tolerances will permit, wound upon the second rod, said solenoid coils being connected in opposition so that the output current of said solenoid coils together is a function of the algebraic sum of the outputs of the coils individually, whereby an output current appears only at regions of a distortion of the earth's magnetic field, means for changing the relative magnetic lengths of said rods to obtain substantially exact axial magnetic balance of said rods, a short-circuited conductor disposed about one solenoid coil, said conductor being axially adjustable to any position along the solenoid coil, a similar short-circuited conductor similarly adjustable disposed over the second solenoid coil, an electric circuit, an amplifier connected to said circuit and connected to amplify the output current of said solenoid coils to energize said circuit upon movement of the torpedo in proximity of a target that causes a distortion of the earth's magnetic field.

24. In an electric control system for a torpedo which during normal operation, a predetermined period after the torpedo is fired, or launched, proceeds through the sea on an even keel at a given depth and speed along a given horizontal path to thus proceed through the earth's normally constant magnetic field at a fixed speed, in combination, a rod of magnetic material disposed on the torpedo in parallel relation to the torpedo axis, a second rod of magnetic material disposed in spaced parallel relation to said first rod, said rods being balanced rods, that is, are selected as near alike in mechanical and magnetic characteristics as possible and so disposed on the torpedo that the rods fall in a vertical plane when the torpedo is on even keel, a solenoid coil wound on the first rod, a solenoid coil, having mechanical and electrical characteristics as near alike as manufacturing tolerances will permit, wound upon the second rod, said solenoid coils being connected in opposition so that the output current of said solenoid coils together is a function of the algebraic sum of the outputs of the coils individually, whereby an output current appears only at regions of a distortion of the earth's magnetic field, means for changing the relative magnetic lengths of said rods to obtain substantially exact axial magnetic balance of said rods, magnetic means adjustable in a horizontal plane to obtain substantially exact horizontal magnetic balance of said rods, magnetic means adjustable in a vertical plane to obtain substantially exact vertical magnetic balance of said rods, an electric circuit, an amplifier connected to said circuit and connected to amplify the output current of said solenoid coils to energize said circuit upon movement of the torpedo in proximity of a target that causes a distortion of the earth's magnetic field.

25. In an electric control system for a torpedo which during normal operation, a predetermined period after the torpedo is fired, or launched, proceeds through the sea on an even keel at a given depth and speed along a given horizontal path to thus proceed through the earth's normally constant magnetic field at a fixed speed, in combination, a rod of magnetic material disposed on the torpedo in parallel relation to the torpedo axis, a second rod of magnetic material disposed in spaced parallel relation to said first rod, said rods being balanced rods, that is, are selected as near alike in mechanical and magnetic characteristics as possible and so disposed on the torpedo that the rods fall in a vertical plane when the torpedo is on even keel, a solenoid coil wound on the first rod, a solenoid coil, having mechanical and electrical characteristics as near alike as manufacturing tolerances will permit, wound upon the second rod, said solenoid coils being connected in opposition so that the output current of said solenoid coils together is a function of the algebraic sum of the outputs of the coils individually, whereby an output current appears only at regions of a distortion of the earth's magnetic field, means for changing the relative magnetic lengths of said rods to obtain substantially exact axial magnetic balance of said rods, magnetic means adjustable in a horizontal plane to obtain substantially exact horizontal magnetic balance of said rods, a short-circuited conductor disposed about one solenoid coil, said conductor being axially adjustable to any position along the solenoid coil, a similar short-circuited conductor similarly adjustable disposed over the second solenoid coil, an electric circuit, an amplifier connected to said circuit and connected to amplify the output current of said solenoid coils to energize said circuit upon movement of the torpedo in proximity of a target that causes a distortion of the earth's magnetic field.

26. In an electric control system for a torpedo which during normal operation, a predetermined period after the torpedo is fired, or launched, proceeds through the sea on an even keel at a given depth and speed along a given horizontal path to thus proceed through the earth's normally constant magnetic field at a fixed speed, in combination, a rod of magnetic material disposed on the torpedo in parallel relation to the torpedo axis, a second rod of magnetic material disposed in spaced parallel relation to said first rod, said rods being balanced rods, that is, are selected as near alike in mechanical and magnetic characteristics as possible and so disposed on the torpedo that the rods fall in a vertical plane when the torpedo is on even keel, a solenoid coil wound on the first rod, a solenoid coil, having mechanical and electrical characteristics as near alike as manufacturing tolerances will permit, wound upon the second rod, said solenoid coils being connected in opposition so that the output current of said solenoid coils together is a function of the algebraic sum of the outputs of the coils individually, whereby an output current appears only at regions of a distortion of the earth's magnetic field, means for changing the relative magnetic lengths of said rods to obtain substantially exact axial magnetic balance of said rods, magnetic means adjustable in a horizontal plane to obtain substantially exact horizontal magnetic balance of said rods, magnetic means adjustable in a vertical plane to obtain substantially exact vertical magnetic balance of said rods, a short-circuited conductor disposed about one solenoid coil, said conductor being axially adjustable to any position along the solenoid coil, a similar short-circuited conductor similarly adjustable disposed over the second solenoid coil, an electric circuit, an amplifier connected to said circuit and connected to amplify the output current of said solenoid coils to energize said circuit upon movement of the torpedo in proximity of a target that causes a distortion of the earth's magnetic field.

27. In an electromagnetic device for producing an electric effect upon movement of said device through the earth's magnetic field, in combination, an electric circuit interconnected with means for supplying electric energy to the circuit, a conveyance in normal operation moving through the earth's magnetic field along a selected horizontal path, a pair of electromagnetically like solenoids disposed in fixed parallel relation to each other and so disposed on the conveyance that the solenoids are in parallel relation to said path of movement, said solenoids being connected in opposition so that a measurable electric effect is produced by said solenoids only upon movement of the solenoids into a region of a distortion of the earth's magnetic field, and electronic amplifying means responsive to the said measurable electric effect for materially increasing the energization of said circuit, means for blocking the operation of said amplifying means during predetermined changes in pressure in the medium through which said conveyance is moving.

28. In an electromagnetic device for producing an electric effect upon movement of said device through the earth's magnetic field, in combination, an electric circuit interconnected with means for supplying electric energy to the circuit, a conveyance in normal operation moving through the earth's magnetic field along a selected horizontal path, a pair of electromagnetically like solenoids disposed in fixed parallel relation to each other and so disposed on the conveyance that the solenoids are in parallel relation to said path of movement, said solenoids being connected in opposition so that a measurable electric effect is produced by said solenoids only upon movement of the solenoids into a region of a distortion of the earth's magnetic field, and electronic amplifying means responsive to the said measurable electric effect for materially increaisng the energization of said circuit, means for blocking the operation of said amplifying means during predetermined changes in pressure in the medium through which said conveyance is moving, means for maintaining said circuit on open circuit over a selected range of movement of said conveyance.

29. In an electric control system for a torpedo which during normal operation a predetermined period after being fired proceeds through the sea at a given depth and speed in a given horizontal direction to thus proceed through the earth's magnetic field at a substantially fixed speed, in combination, a pair of like rods of magnetic material disposed in as near parallel relation to each other as accurate mounting will permit to provide magnetically balanced rods and disposed on the torpedo so as to have a fixed relation to the torpedo axis, an electric coil on one rod, an electric coil of the same number of turns and same mechanical and electrical characteristics on the other rod, said second oil being connected in opposition to said first coil whereby the output of said coils together is a function of the algebraic sum of the individual outputs of the coils separately, whereby an output current appears only at regions of distortion of the earth's magnetic field, an electric circuit, means responsive to the output current of said coils for controlling the energization of said circuit, and means responsive to countermining action producing pressure surges in the sea for preventing energization of said circuit during the interim of the countermining effect.

30. In an electric control system for a torpedo which during normal operation a predetermined period after being fired proceeds through the sea at a given depth and speed in a given horizontal direction to thus proceed through the earth's magnetic field at a substantially fixed speed, in combination, a pair of like rods of magnetic material disposed in as near parallel relation to each other as accurate mounting will permit to provide magnetically balanced rods and disposed on the torpedo so as to have a fixed relation to the torpedo axis, an electric coil on one rod, an electric coil of the same number of turns and same mechanical and electrical characteristics on the other rod, said second coil being connected in opposition to said first coil whereby the output of said coils together is a function of the algebraic sum of the individual outputs of the coils separately, whereby an output current appears only at regions of distortion of the earth's magnetic field, an electric circuit, means responsive to the output current of said coils for controlling the energization of said circuit, and means responsive to predetermined changes in depth of operation of the torpedo for preventing energization of said circuit.

31. In an electric control system for a torpedo which during normal operation a predetermined period after being fired proceeds through the sea at a given depth and speed in a given horizontal direction to thus proceed through the earth's magnetic field at a substantially fixed speed, in combination, a pair of like rods of magnetic material disposed in as near parallel relation to each other as accurate mounting will permit to provide magnetically balanced rods and disposed on the torpedo so as to have a fixed relation to the torpedo axis, an electric coil on one rod, an electric coil of the same number of turns and same mechanical and electrical characteristics on the other rod, said second coil being connected in opposition to said first coil whereby the output of said coils together is a function of the algebraic sum of the individual outputs of the coils separately, whereby an output current appears only at regions of distortion of the earth's magnetic field, an electric circuit, means responsive to the output current of said coils for controlling the energization of said circuit, means responsive to countermining action producing pressure surges in the sea for preventing energization of said circuit during the interim of the countermining effect, and means responsive to predetermined changes in depth of operation of the torpedo for preventing energization of said circuit.

32. In an electric control system for a torpedo which during normal operation a predetermined period after being fired proceeds through the sea at a given depth and speed in a given horizontal direction to thus proceed through the earth's magnetic field at a substantially fixed speed, in combination, a pair of like rods of magnetic material disposed in as near parallel relation to each other as accurate mounting will permit to provide magnetically balanced rods and disposed on the torpedo so as to have a fixed relation to the torpedo axis, an electric coil on one rod, an electric coil of the same number of turns and same mechanical and electrical characteristics on the other rod, said second coil being connected in opposition to said first coil whereby the output of said coils together is a function of the algebraic sum of the individual outputs of the coils separately, whereby an output current appears only at regions of distortion of the earth's magnetic field, an electric circuit, means responsive to the output current of said coils for controlling the energization of said circuit, means responsive to countermining action producing pressure surges in the sea for preventing energization of said circuit during the interim of the countermining effect, and means for connecting said circuit in operative relation to the output current effects of said coils only after a predetermined travel of the torpedo from its firing, or launching, position.

33. In an electric control system for a torpedo which during normal operation a predetermined period after being fired proceeds through the sea at a given depth and speed in a given horizontal direction to thus proceed through the earth's magnetic field at a substantially fixed speed, in combination, a pair of like rods of magnetic material disposed in as near parallel relation to each other as accurate mounting will permit to provide magnetically balanced rods and disposed on the torpedo so as to have a fixed relation to the torpedo axis, an electric coil on one rod, an electric coil of the same number of turns and same mechanical and electrical characteristics on the other rod, said second coil being connected in opposition to said first coil whereby the output of said coils together is a function of the algebraic sum of the individual outputs of the coils separately, whereby an output current appears only at regions of distortion of the earth's magnetic field, an electric circuit, means responsive to the output current of said coils for controlling the energization of said circuit, means responsive to predetermined changes in depth of operation of the torpedo for preventing energization of said circuit, and means for connecting said circuit in operative relation to the output current effects of said coils only after a predetermined travel of the torpedo from its firing, or launching, position.

34. In a control system for a torpedo, in combination, an electric circuit including a detonator, a pair of solenoids having paramagnetic cores disposed on the torpedo in spaced parallel relation to each other and disposed in parallel relation to the torpedo axis and in a vertical plane when the torpedo is operating on even keel, means for polarizing each solenoid, the solenoids and polarizing means therefor being so selected that the solenoids are substantially perfectly balanced, said solenoids being connected in opposition so that potential of the solenoids together as they are moved through the earth's uniform magnetic field in view of their balance is substantially zero but is of measurable value upon movement of the solenoids through a region of distortion of the earth's magnetic field as occurs in proximity of a ship, means responsive to a potential of one polarity produced by said solenoids for setting up a portion of the circuit for the detonator, and means responsive to the reversal of the polarity of the potential of said solenoids for completing the circuit for said detonator.

References Cited in the file of this patent

UNITED STATES PATENTS

| | | |
|---|---|---|
| 661,520 | Haskins | Nov. 13, 1900 |
| 1,379,972 | Fiske | May 31, 1921 |
| 2,397,137 | Glennon et al. | Mar. 26, 1946 |
| 2,397,678 | Minkler | Apr. 2, 1946 |
| 2,406,870 | Vacquier | Sept. 3, 1946 |